UNITED STATES PATENT OFFICE.

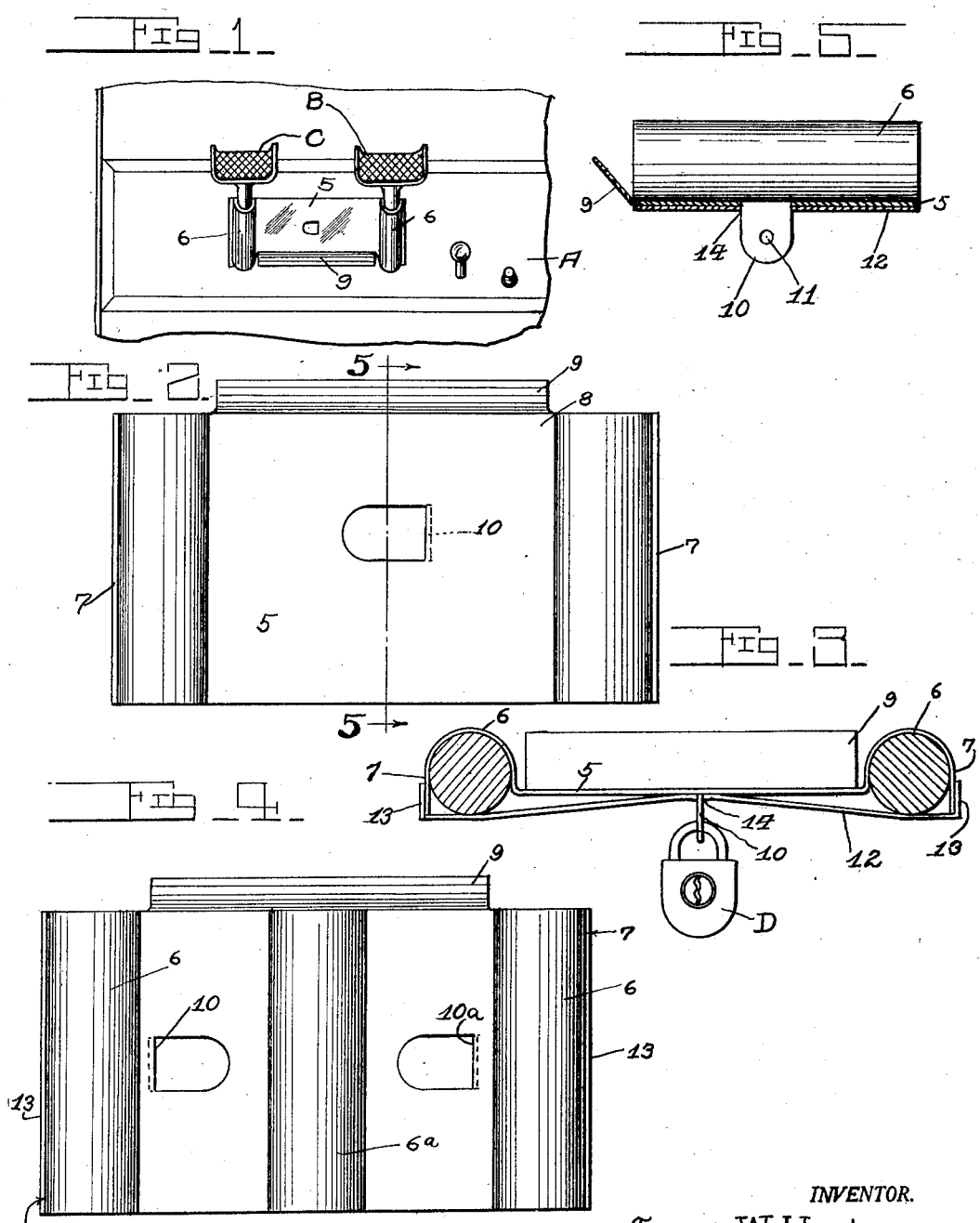

JOSEPH W. HUGHES, OF BETHLEHEM, PENNSYLVANIA.

AUTOMOBILE-LOCKING DEVICE.

1,393,022.  Specification of Letters Patent.  Patented Oct. 11, 1921.

Application filed September 29, 1920. Serial No. 413,538.

*To all whom it may concern:*

Be it known that I, JOSEPH W. HUGHES, a citizen of the United States, residing at Bethlehem, in the county of Northampton and State of Pennsylvania, have invented certain new and useful Improvements in Automobile-Locking Devices, of which the following is a specification, reference being had to the accompanying drawings.

This invention relates to locking devices, and particularly to locking devices for locking the controlling means of automobiles.

An object of the invention is to provide a device of this character adapted to embrace the controlling levers or pedals of an automobile to render movement of the same impossible either individually or collectively.

Another object of the invention is to provide a device of this character adapted to extend between and embrace two or more pedals or levers and to engage the dashboard or floor of the automobile to render movement in any direction impossible.

A still further object of the invention is to provide a locking device of this character including a pair of clamping plates adapted to embrace the controlling means of an automobile, and wherein the plates are secured to each other by fastening means carried by one of said plates and extend through the opposite plate between the portions of said plates embracing the controlling means.

A still further object of the invention is to provide a device of this character including a pair of plates, one of said plates being adapted to partially embrace the brake and clutch pedals of an automobile and a second clamping plate adapted to embrace the end portions of the first mentioned clamping plate and the unembraced portions of the brake and clutch pedals, and a keeper carried by the first mentioned plate for the reception of fastening means to force the intermediate portions of said plates into engagement with each other.

A still further object of the invention is to provide a device of this character capable of being formed from sheet metal in view of its simplicity.

With the above and other objects in view, the invention consists in the improved construction and arrangement of parts to be hereinafter more particularly described, fully claimed and illustrated in the accompanying drawings, in which:—

Figure 1 is a fragmentary perspective view of an automobile looking toward the driver's seat, and showing the invention applied, Fig. 2 is a plan view of the body member of the device, Fig. 3 is a top plan view of the invention applied, the pedals being shown in section, Fig. 4 is a plan view of a modified form, and Fig. 5 is a sectional view taken on the line 5—5 of Fig. 2.

Referring to the drawings, A designates an automobile dashboard through which the controlling pedals such as the brake pedal B and clutch pedal C extend. It is of course obvious that the pedals need not be of any particular construction as the device may be applied to any form of pedal including a shank.

In order to lock the pedals B and C and prevent operation of the automobile by an unauthorized person, a novel and simple locking device is provided and comprises a body member or clamping plate 5, formed from a sheet of metal. Each of the end portions of the plate 5 are extended downwardly and then upwardly to provide semicircular recesses or sockets 6 at the end portions of the plate. It will be noted that the ends 7 of the plate extend above the body thereof, in spaced parallel relation to each other so that one wall of the recess is higher than the other. These recesses are constructed to conform to the contour of the shanks of the pedals B and C to receive and snugly fit the same. It is of course obvious that the plate 5 may be made of any length according to the distance between the pedals B and C, and of any width desired. The longitudinal edge 8 of the plate 5 is provided with an extension 9 which extends between the inner wall of each of the recesses 6 and longitudinally of the main portion of the plate. This extension is extended toward the end wall of the recesses in angular relation to the body member so as to permit the plate 5 to conform to the angle formed by the coöperation of the dashboard and the inoperative position of the pedals B and C. In this way the extension provides a foot for maintaining the plate 5 in an inclined position so as not only to engage the pedals but also the dashboard A. Struck from the intermediate portion of the plate 5 in the direction of the ends 7, is a keeper 10 having an opening 11 adapted to receive a lock of any type.

The portion of the invention just described, forms one section of the locking device, the other section consists of a holding or clamping plate 12 formed of sheet metal, and corresponding in width to the width of the plate 5. The ends 13 of the plate 12 are extended at right angles to said plate in spaced parallel relation to each other. The inner surface of the ends 13 are intended to engage the outer surface of the ends 7 of the plate 5. The holding or clamping plate 12 is intended to be disposed over one face of the plate 5. A slot 14 is also provided in the plate 12, and is adapted to receive the keeper 10. As the ends 7 of the plate 5 are disposed above one face of the plate, they engage the confronting face of the plate 12 and prevent said plate from engaging the face of the plate 5. It will also be noted that the inner walls of the recesses 6 are lower than the outer walls so that portions of the pedals B and C are exposed. This particular feature permits the plate 12 to engage the exposed portions of the pedals. When the plate 12 is thus applied, it is disposed in spaced relation to the intermediate portion of the plate 5. After the keeper is passed through the opening 14, the opening 11 is so positioned that the shackle of the lock D will force the intermediate portions of the plates 5 and 12 into engagement with each other thereby firmly binding the plate 12 over the shanks of the pedals at the same time causing the ends 13 to urge the ends 7 inwardly.

In Fig. 4, another form of the invention is shown. This form is intended to receive two or more pedals or levers. In this instance, a third recess 6ª is formed in the intermediate portion of the plate or in fact any portion thereof between the recesses 6 and 7 according to the position of the levers on the automobile. The hasp 10 and slot 14 are then extended to one side between one end recess and the intermediate recess. A second hasp 10ª is provided in the space between the opposite end recess 6 and the intermediate socket so as to permit the device to be firmly secured to the pedals. It is of course obvious that any number of recesses may be formed between the principal end recesses 6 according to the number of pedals used and the size of the locking device, as the number of recesses between the end recesses do not conflict with the operation of the device.

In the application of the lock, the foot 9 is disposed in engagement with the dashboard A closely adjacent the shanks of the pedals B and C, the pedals B and C being snugly disposed between the recesses 6. The clamping plate 12 is positioned over the plate 5 with the ends 13 in engagement with the ends 7. The hasp is then forced through the opening 14 and the lock D applied. The pedals are then firmly locked it being impossible to move them in view of the engagement of the foot 9 with the dashboard and also of the binding engagement of the plates on the shanks.

From the foregoing it will be readily seen that this invention provides a novel, simple and practical form of automobile lock that can be readily applied, does not have to be attached to the automobile and when not in use can be stored in the tool box as it occupies a small space. In addition to this it can be formed from sheet metal and is capable of providing three locking actions, namely that of the extension 9 in engagement with the dashboard A of the automobile, the binding engagement of the plates 12 on the shanks, through the medium of the ends thereof, and the forcing of the intermediate portions of the plates into engagement with each other. It is impossible to tamper with the keeper so as to remove it, as the keeper forms part of the plate 5 and is not attached thereto by rivets or other fastening means. It is of course obvious that the extension 9 may be formed to permit application of the device to all types of automobiles, for instance to permit the same to clear the base of the steering post or like parts. In view of this, I do not wish to limit myself to the specific construction of the invention as herein disclosed, as modifications may be made to permit convenient application of the device, without departing from the spirit of the invention and scope of the claims.

What I claim is:—

1. The combination with an automobile including a brake and clutch pedal, of locking means therefor comprising a clamping plate, means carried by the plate for the reception of the brake and clutch pedal, supporting means carried by said plate for engaging the dashboard of the automobile and a second clamping plate embracing the first mentioned plate, means for detachably securing said plates to each other, said plates coöperating with each other through the medium of the supporting means of the first mentioned plate to prevent movement of the brake and clutch pedals.

2. An automobile locking device of the character described comprising a pair of clamping plates the ends of said plates being extended substantially at right angles to the body portion of the plates, one of said plates being provided with sockets adapted to receive spaced movable shanks carried by the automobile, the ends of the last mentioned plate being adapted to engage the inner faces of the ends of the remaining plate, means for locking said plates to the shanks, said means causing the second mentioned plate to draw the ends of the first mentioned plate inwardly and bind the socket members on the shanks, and a foot carried by the lower side portion of the first mentioned plate, said foot being adapted to engage the floor of the automobile whereby movement of the shanks and plates relative to the floor is prevented.

In testimony whereof I hereunto affix my signature.

JOSEPH W. HUGHES.